8998X
D. B. Moore
Sawing Shingles,
Patented Aug. 15, 1835.
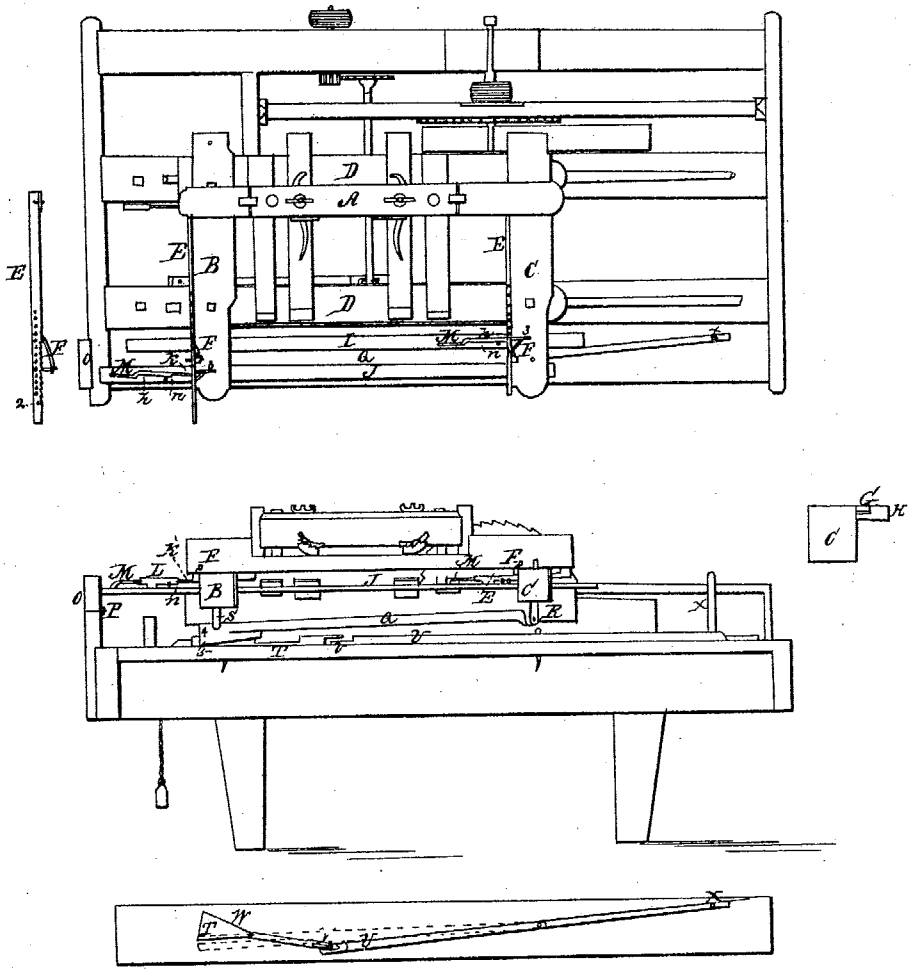
AM. PHOTO-LITHO. CO., N.Y. (OSBORNE'S PROCESS)

Aug. 15. 1835 8998X 41.

David B Moore of Gilmanton New Hampshire
Letters Patent.

The Schedule referred to in these Letters Patent and making part of the same, containing a description in the words of the said David B Moore himself of his improvement in a machine for Sawing Shingles To all to whom these presents shall come; Be it known that I David B Moore of Gilmanton in the County of Strafford and State of New Hampshire have invented a new and useful improvement in the mode of sawing Shingles, which I have adapted to Earls Patented Shingle machine, and claim it as an improvement thereon, and the following is a full and exact description of the construction and operation of the said machine as invented or improved by me. The object of my improvement is to produce such an arrangement of machinery as will present the bolt or piece of wood, from which the shingles are to be cut, & the operation of the saw in a much more simple and efficacious manner than heretofore, and which I proceed to set forth or describe. by reference to the drawings which accompany this specification after the following method, which moves the bolt in towards the saw, and confines firmly in its place, one end thereof while the carriage returns and moves inwards the other end, thus. A represents the head stock, which slides horizontally ~~between~~ upon the two transverse beams B. C. of the carriage D. The motion of this head stock is regulated by means of a set plate E. at each end and which consists of a thin flat bar of iron perforated with holes at about the distance apart of the thickness of the butt of a shingle, and having the upper edge formed into teeth. At the same distance apart, as the holes and pointing from the head stock.
These set plates are made firm to the underside of the

8998X head stock and slide at right angles therefrom, one along the hinder side of the hinder transverse beam B. and the other upon the hinder side of the forward transverse beam C, upon the top of each of these beams B. & C is fixed an arm or fall F which falls into each notch as the slide set plate E advances and and holds it secure from any tremulous motion backwards lest the pointer should miss the hole as described hereafter. A tongue G. and groove H. is fastened at the forward side of each beam B. C. to assist in guiding the head stock A. Two mortises are cut through the end of each transverse beam for the reception of the pointing rods I. J. which play forward and backward therein under the set plates E. and project beyond these beams about six inches at the front and at the hinder ends, in size they will be about two inches by about three quarters of an inch. Upon the tops of these rods are placed the pointers K. which are two cylindrical pieces of iron pointed of about three inches in length, by about one third of an inch in diameter each being insirted to project forwards into a button or piece of wood L about one inch high, one to be placed behind the hinder set plate and the other behind the forward set plate. The button works, or turns upon a pivot in its hinder part driven into the pointing rod and has behind it a small spring M. bearing against the hinder end of the button, in such a manner as to constantly bear the opposite or pointed end K in a direction leading from the head stock, or outwards from the saw. in which direction it flies until arrested by means of a small pin or guard n. and this distance at which it is arrested is such as always to stop the point opposite to the hole in the set plate that it is to enter. And here the arm or fall is of use as it prevents any possibility of the set plate sliding too far back by the trembling of the machine to present any other than the proper hole or distance to the pointer. When the carriage D moves backwards, the pointing rod J whose pointer is disengaged, is forced against a head block O. which is secured in an upright position and the back part of the top of the longitudinal beam of the frame, and thrust at once into ~~the~~ an opening left in the end of each transverse beam for that purpose and ~~and~~ which forms an incli
ned plane, rising or advancing inwards towards the saw and is lined with
metal so that the moment the pointer enters the hole 2. it is forced to
slide or thrust up this plane, coming in contact with the metal and
continues up until it arrives at a long hole 3. continues forwards in
a straight line at the top of this inclined plane, into which it enters
and there remains holding the set plate firm until it is withdrawn
when the other pointer is to enter its hole and so alternately. The
length of this inclined plane is to be adjusted to the length or distance
of the holes apart, so that there shall be no impediment to entering
the next hole at the return of the pointer by which means the setting plate
and head stock is advanced each time the distance of a hole. The head
stock is formed to be double over or shut down by means of a hinge P.
so as to present only so much in height as will allow the pointing rods
to pass over it when it is necessary to put in a new bolt & recommence
sawing. It remains to show or describe the arrangement by which is
given the alternate play to the two pointing rods, which their fixtures
so that by means of the set plates & the head block is made to approach
nearer to the saw. A rod which I call a shipper rod Q is attached to
the lower end of the forward transverse beam, by means of a pin passing
through the said beam and secured at the top side thereof by a pin or
other means, and this pin is attached by means of a swivel ~~joint~~ joint R.
also acting as an up and down hinge joint, and the forward end of the
shipper rod. This pin is passed through the transverse beam just between
the pointing rods. The shipper rod extends from the forward beam to the hin
der one where its end is reduced to a rounded edge 4. for the purpose of sliding
past the shifting rods, ~~and~~ its under side 5. is also reduced to a long
pointed shape, as will be best explained by reference to the drawing inten
ded to slide past the pointed joint of the shifting rods on its advancing
forwards which it does by being trailed after the forward transverse
beam and upon the longitudinal beam of the frame by means of the pin
and swivel joint. There are two pins S inserted into the lower

8998X side of the hinder transverse beam, directly under the mortise through which the pointing rods slides and are intended to secure the shipping rod in its position when passing the triangular end of the shifting rod. Beneath this shifting rod, and upon the longitudinal beam I place the shifting rods T. U. connected by the joint V. and working or moving upon the pivot W. let into the longitudinal beam. These shifting rods extend from the hinder beam to some distance before the forward beam (the piv-ot of the shifting rod U being situated about a little in advance of the forward beam) and at this forward end an upright pin X is pla-ced of sufficient hight to reach to or touch either one or the other of the pointing rods as they may be presented in front of the forward beam, which causes that pointing rod to recede and consequently to carry back or disengage its pointer: when by the return of the carriage the next point-ing rod presents itself to the pin X and has its pointer disengaged in like manner. This alternate presentation is effected by means of the formation of the hinder or triangular end T, of the shifting rod (the shape of which is best understood by the drawing) which being movable upon the joint V thereof and turning ^{up}on its pivot W. when the end of the shipper rod 4. slides backwards and forwards over the space between (the dotted lines in the drawing) the joint V and the pivot W. of the tri-angular rod T. This distance and the width of the triangular rod is so adjusted that at each passage of the shipping rod between the said triangular end and the pin 8 which is immoveable, the triangular end T must turn on its pivot and consequently give a contrary direction to the joint V. which again brings the forward end with the pin X to turn to the same side as the triangular end T and this motion alternates so as to bring the pin X first to one pointing rod and then to the other, by which means the respective pointers are disengaged on one bar and thrust in on the other so as to advance the setting plates alternately and consequently the bolt from which the shingle is to be cut by which the butt and thin edge of the shingle is formed. the carriage runs back after the cut is made by means of a weight attached to it 2291 8998X running on a pulley behind. "What I claim as my invention and not before known in the above described machine is the arrangement or combination by which I produce the alternate motion that presents first one end & then the other of the bolt or wood to be sawed; but I do not claim that motion it having been used before but simply the means by which I effect it and which consists of the following parts. viz 1st. the set plates C as formed and applied according to the description with the application of the arm or pall. for the use described 2dly. the pointing rods and pointers as set forth. 3dly the head stock used as above. 4thly. the manner in which I shape and use the shipper rod. 5thly. the shape and formation of the shifting rods.

In testimony that the above is a full and exact description of the construction and modes of operation of my machine as invented or improved by me. I have hereunto set my hand this first day of June eighteen hundred and thirty five Exd.

David B. Moore

1 HT

Witnesses
B K Morsell
Henry Stone (Patented 15 August 1835)

(1846 words) (Drawing)